May 25, 1937. A. A. THOMAS 2,081,686
REMOTE CONTROL APPARATUS FOR ELECTRIC TUNING SYSTEMS
Filed July 19, 1928 6 Sheets-Sheet 1
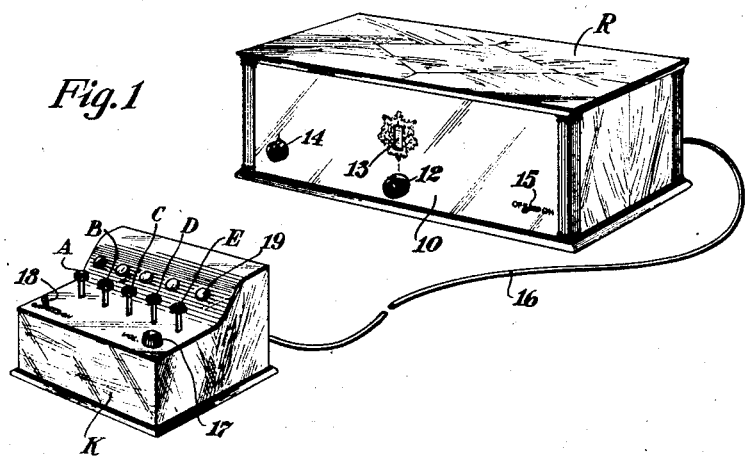
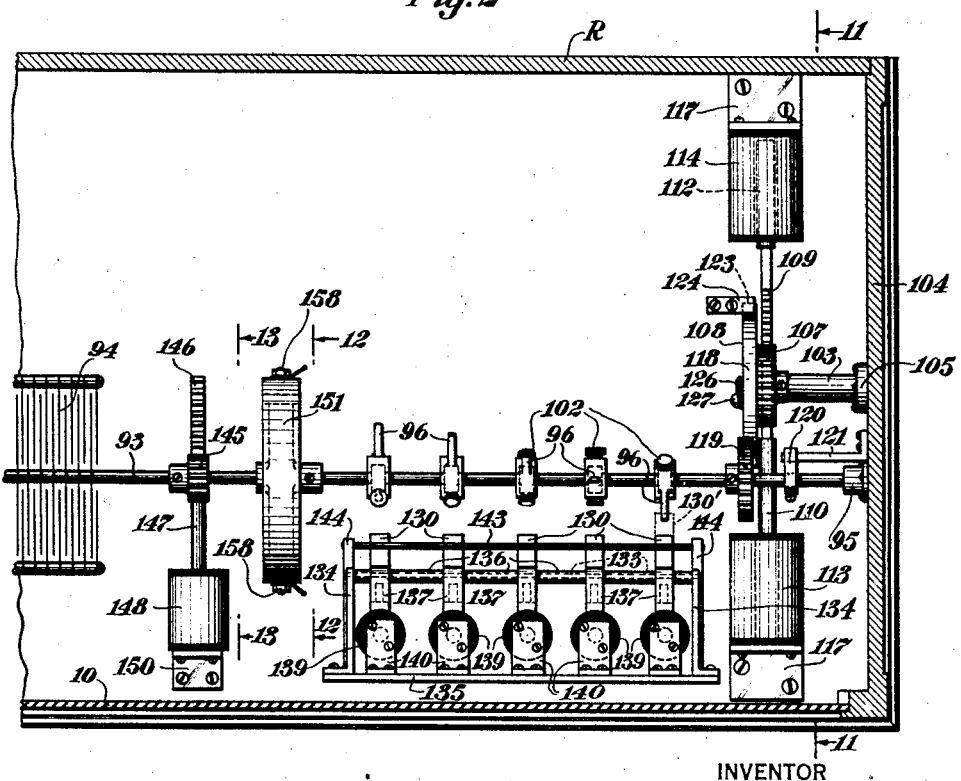
INVENTOR

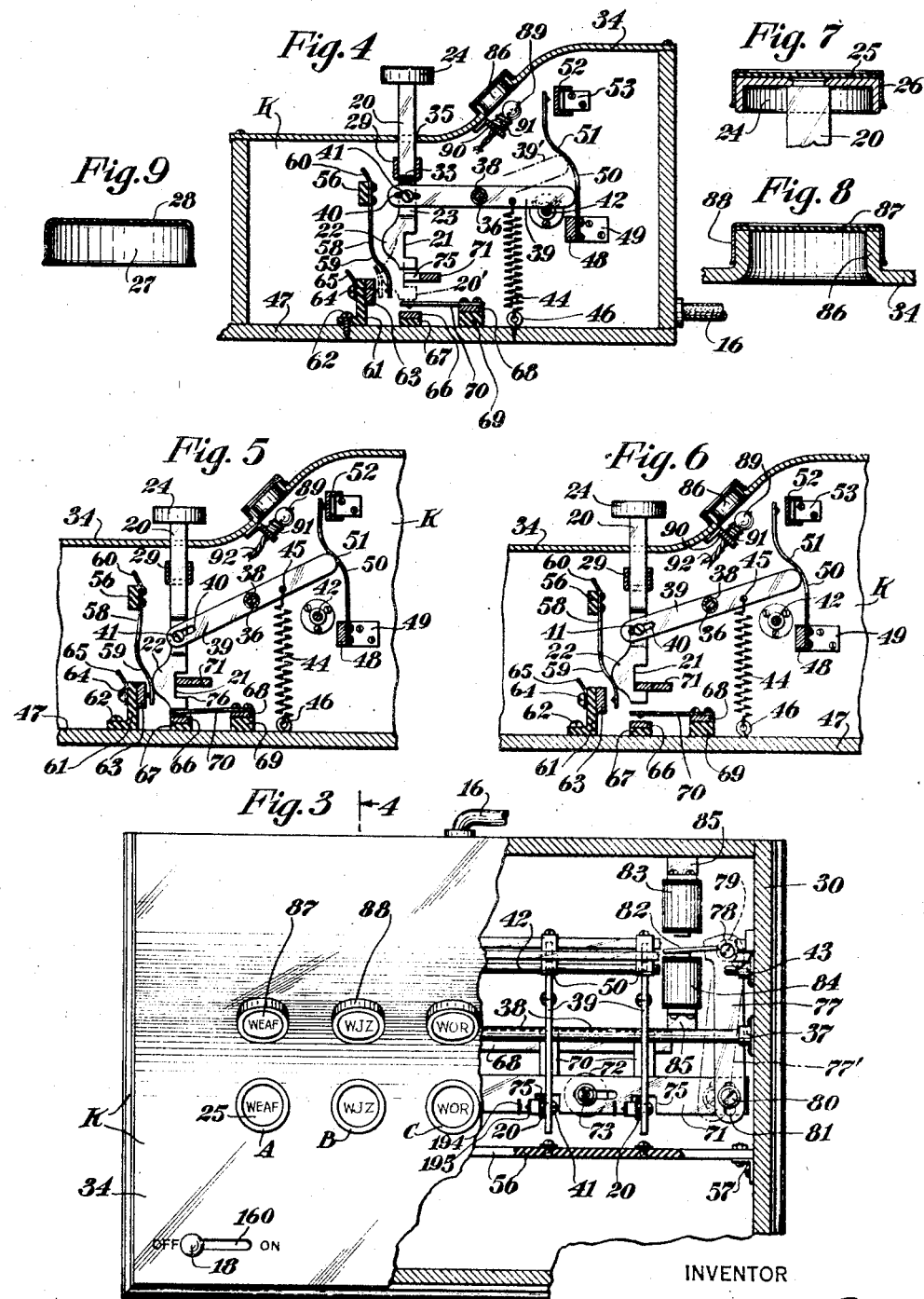

May 25, 1937.  A. A. THOMAS  2,081,686

REMOTE CONTROL APPARATUS FOR ELECTRIC TUNING SYSTEMS

Filed July 19, 1928   6 Sheets-Sheet 3

INVENTOR

Adolph A. Thomas

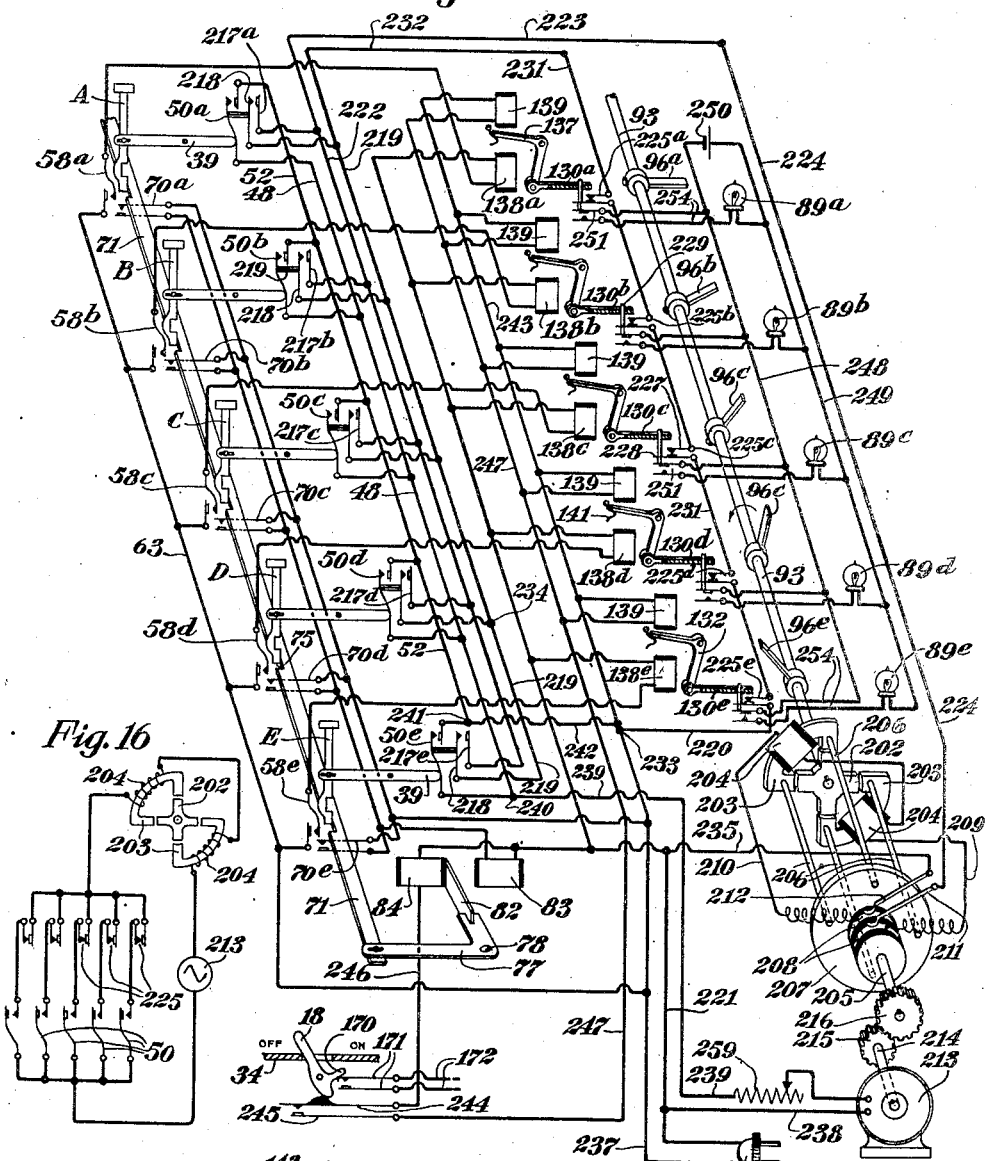

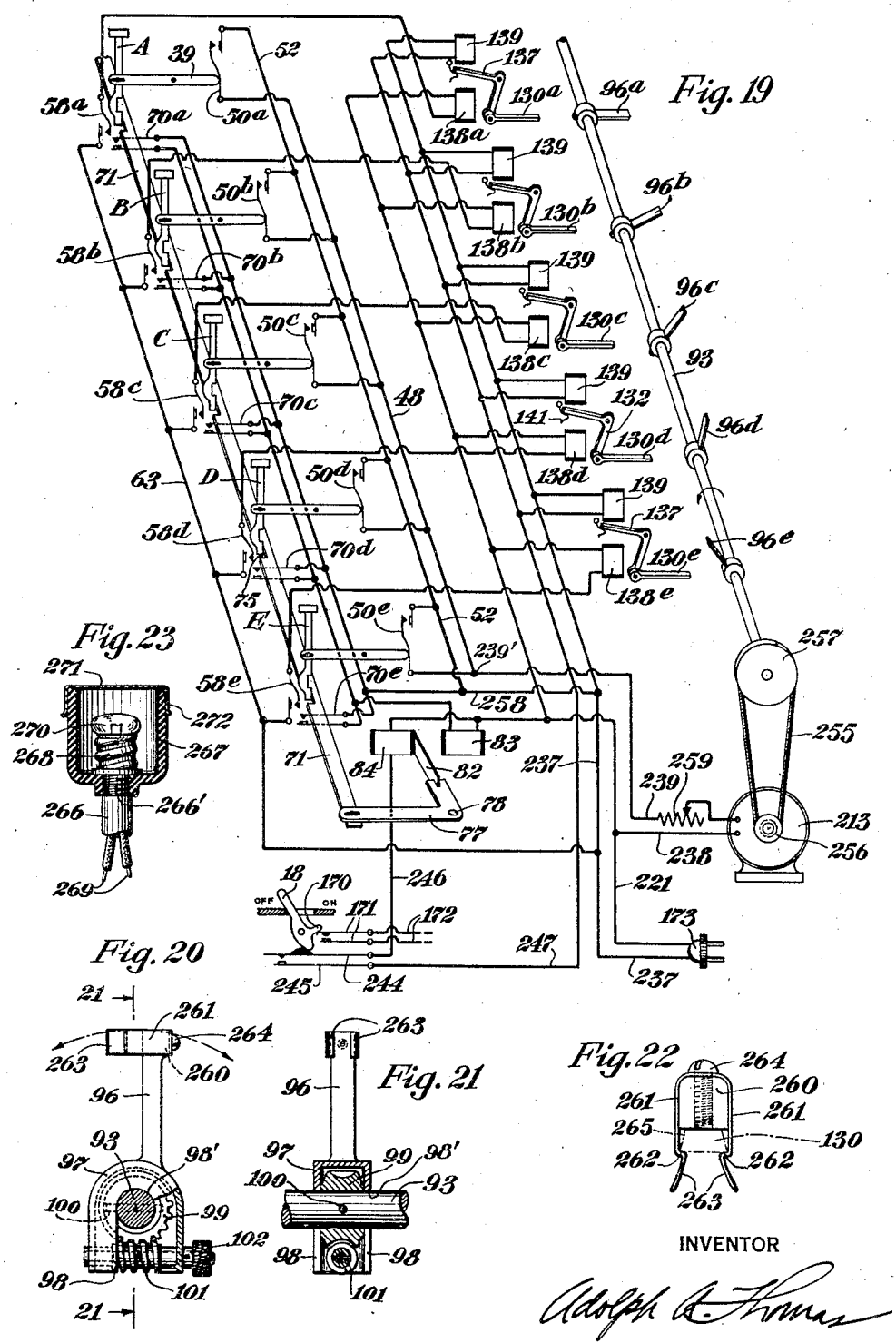

Patented May 25, 1937

2,081,686

UNITED STATES PATENT OFFICE 2,081,686

REMOTE CONTROL APPARATUS FOR ELECTRIC TUNING SYSTEMS

Adolph A. Thomas, New York, N. Y., assignor to Radio Corporation of America, New York, N. Y., a corporation of Delaware Application July 19, 1928, Serial No. 293,861

37 Claims. (Cl. 250—20)

This invention relates to the art of broadcast reception, and its object is to provide novel means for electrically adjusting the tuning mechanism of a radio set at a distance to bring in any one of a number of selected stations. In a preferred form of my invention, I employ a control box or cabinet having a series of keys, or other hand-operable members, each representing a certain broadcasting station as chosen by the manufacturer or the owner of the apparatus. This control box may be at any distance from the radio set, and the desired station is brought in by simply pushing down the corresponding key. No other manual operation is necessary. The mere depression of a key, or whatever form of hand-operable member is used, automatically controls electromagnetic connections which turn the tuning shaft (or shafts) of the radio set the right amount. The control apparatus requires no attention when changing from one station to another, except actuating the selected key. Furthermore, the tuning shaft is always free to be operated by hand in the usual way independently of the remote control connections. This enables a person to bring in stations not represented by the keys of the control box.

The accompanying drawings show several practical examples of remote control apparatus embodying my invention. I shall describe these illustrative embodiments in detail, so that those skilled in the art may fully understand this invention and put the same to practical use. In these drawings—

Fig. 1 is a perspective view of a radio receiver provided with my automatic tuning attachment, the control box being remote from the receiver and electrically connected thereto by conductors in the form of a single cable;

Fig. 2 shows an inside plan view of that portion of the radio receiver which contains the mechanism for operating the condenser shaft;

Fig. 3 illustrates the control box in plan, the cover being partly broken away to disclose certain parts inside;

Fig. 4 is a transverse section on line 4—4 of Fig. 3, with one of the keys and its associated switches in normal position;

Figure 10:
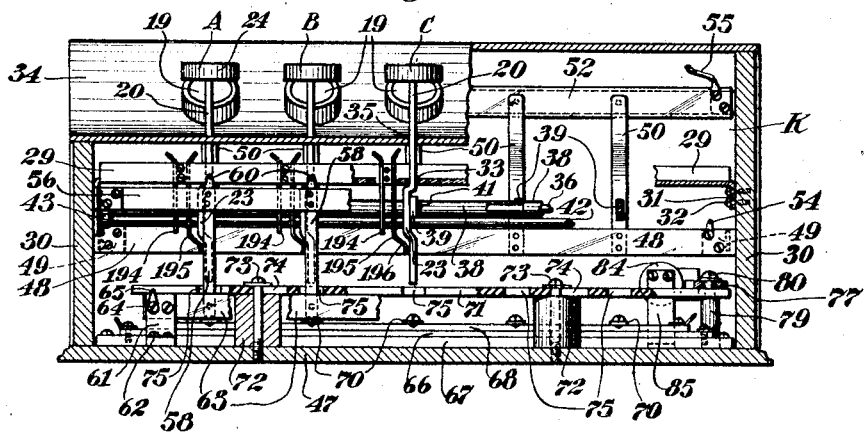
Figure 11:
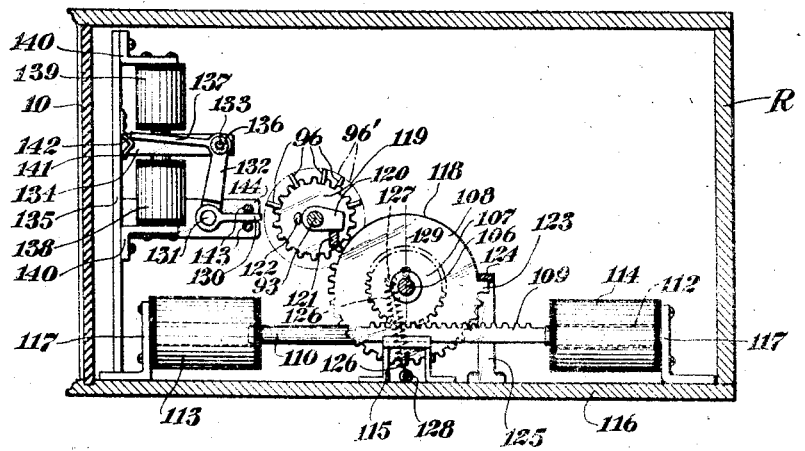
Figures 12, 13:
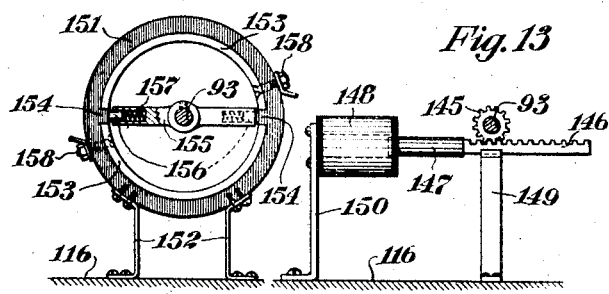
Figure 14:
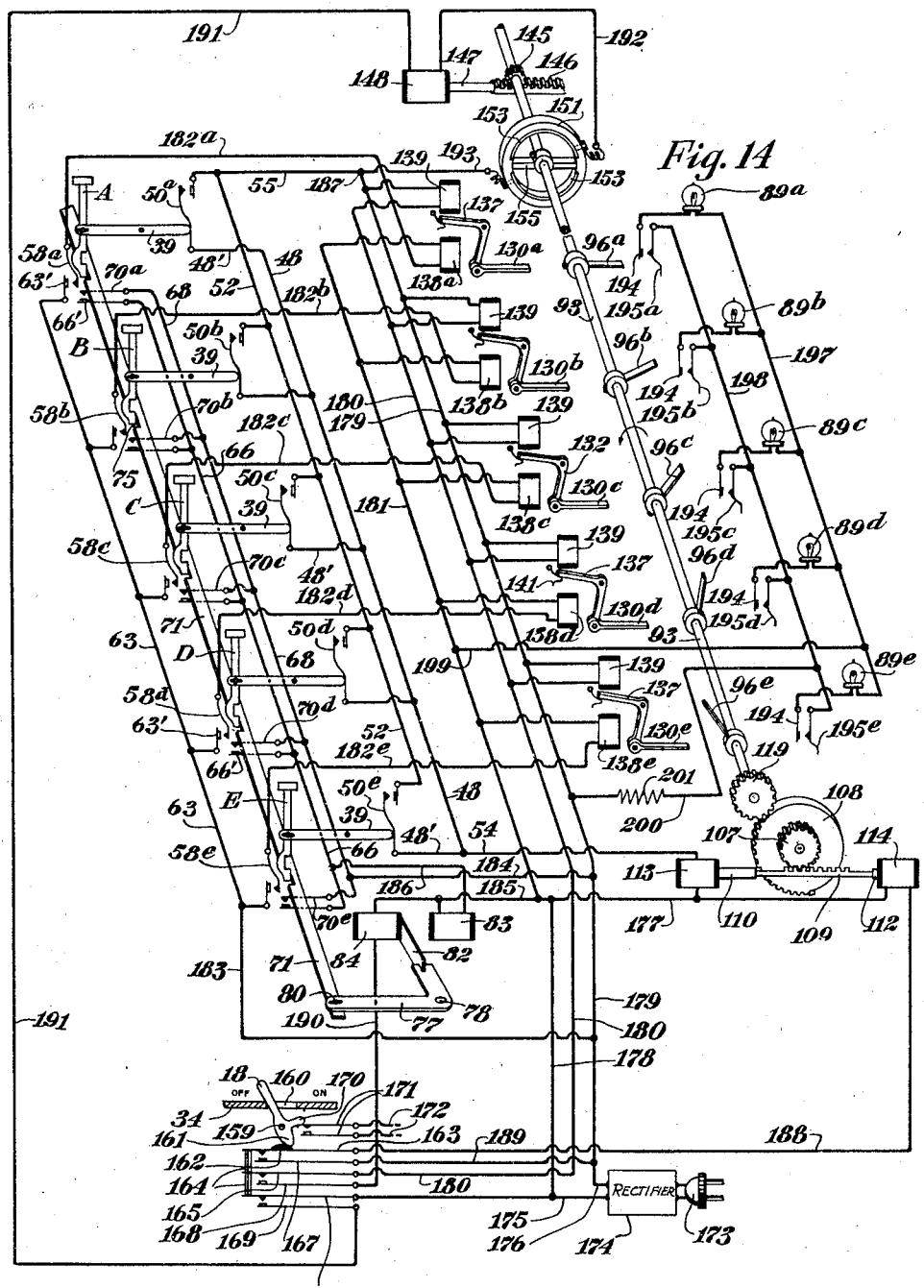

Fig. 5, which is like Fig. 4, shows the key fully depressed to close the switches that control certain circuits, as will later be described;

Fig. 6 is similar to Figs. 4 and 5, and shows the depressed key locked against return movement, the associated switches being open;

Fig. 7 is an enlarged sectional detail of the head of a key provided with a removable disk which carries notations identifying a certain broadcasting station;

Fig. 8 is an enlarged sectional detail of one of the illuminated windows in the control box;

Fig. 9 shows in section a cap adapted to be removably fitted over a key head or a window of the control box for identifying a selected station;

Fig. 10 is a front view of the control box, partly in section to reveal the inside mechanism;

Fig. 11 represents a transverse section on line 11—11 of Fig. 2, showing the electromagnetic mechanism that operates and controls the tuning shaft when a key is actuated;

Figs. 12 and 13 are detail views on lines 12—12 and 13—13 of Fig. 2 to show the arrangement for automatically returning the tuning shaft to normal position when the main switch in the control box is opened;

Fig. 14 is a diagram of the circuit connections between the control box and the electromagnetic mechanism that operates the tuning shaft, it being understood that this diagram is based on the mechanical views of the preceding figures;

Fig. 15 illustrates, in a diagrammatic way, a modification in which the tuning shaft is connected to an electric motor through a magnetic clutch controlled by the keys of the control box;

Fig. 16 is a diagram showing a parallel arrangement of switches that control the magnetic clutch embodied in Fig. 15;

Figs. 17 and 18 are details of certain switches included in Fig. 15 for controlling the clutch circuit, Fig. 17 showing the switch in normal closed position, and Fig. 18 showing the switch opened by the associated arm on the condenser shaft;

Fig. 19 illustrates diagrammatically another modification in which an electric motor is connected to the tuning shaft through a slip-clutch arrangement;

Figs. 20 and 21 are detail views at right angles to each other, partly in section, showing an adjustable mounting of the radial stop arms on the tuning shaft;

Fig. 22 is a detail showing how the radial stop arms or projections on the tuning shaft are automatically locked to the associated key-controlled stops; and Fig. 23 is a sectional detail of a key provided with a head that contains a lamp for illuminating the cap of the key.

Before taking up a detailed description of the drawings, I wish to explain that the parts in the mechanical views have been purposely spread out for clearness, and their relative proportions have been exaggerated for the same reason. The actual mechanism can be made more compact than the drawings indicate. It will therefore be understood that the illustrations about to be described are not to be taken as shop drawings made to accurate scale.

Referring to Fig. 1, the cabinet R represents a radio-receiving set of any approved construction and design, the details of which need not be shown or described. In the right-hand portion of the radio cabinet R is housed the electromagnetic mechanism which operates the tuning shaft to bring in a selected station, as will be fully explained in due course. The front panel 10 of radio receiver R has a tuning knob 12 for manually turning the condenser shaft (or shafts) to bring in a desired station. It is not necessary to show any driving connections between the knob 12 and the condenser shaft, because such connections are well known and are to be found in all the radio receivers available in the market. A suitable dial 13 indicates the correct position of the condenser shaft for any selected station. A knob 14 regulates the volume of reproduction, and a switch 15 closes and opens the main operating circuit of the set, which may be connected to a battery or to a house lighting circuit.

The automatic tuning mechanism of radio receiver R is electrically connected by a cable 16 to a control box, indicated as a whole by K, which may be placed at any distance from the receiver. The cable 16 is supposed to contain all the conductors required to effect the necessary circuit connections between the control box and the tuning mechanism housed in the radio cabinet. The control box K has a set of manually operated members marked A, B, C, D and E, which are shown in the form of depressible keys, but which may be in the form of push buttons, snap-over levers, and the like. For brevity, however, I shall refer to the parts A-E as keys. It has been assumed here that the radio set has an automatic tuning range for five stations selected by the owner or maker of the receiver, and so there are five keys in the control box, each key representing one of the selected stations. The operative connections between the control box K and the radio set R are such that the mere depression of a key automatically tunes in the corresponding station. A knob 17 on the control box enables the operator to regulate the volume of reproduction, and a switch 18 throws the radio set into and out of circuit with the batteries or house lighting circuit. In other words, the knob 17 and switch 18 on the control box K perform the same functions as the knob 14 and switch 15 on the radio cabinet R. For this purpose, the electric connections controlled by the parts 14 and 15 may be arranged in parallel with the connections controlled by the parts 17 and 18. It will not be necessary to show any circuit connections by which the radio set is thrown into and out of circuit, nor any connections for regulating the volume, because such matters are well understood in the radio art. For instance, the knobs 14 and 17 may control, each independently of the other, a variable resistance shunted across the secondary of the first audio transformer, as will be understood without further explanation. The control box K is preferably provided with windows 19, one for each key, and these windows may have marked thereon the names or call letters of the selected stations. When a key is pushed down to bring in the desired station, a lamp circuit is automatically closed and the corresponding window is lighted to inform the operator that the station has been tuned in. The window remains lighted during the operation of the receiver, and thereby informs the operator (or anybody looking at the control box) which particular station is on the air.

Having now described in a general way the manner in which my invention is used to tune a radio receiver from a distance by merely operating a key, I shall now take up a detailed description of the various mechanisms for accomplishing the results mentioned. I shall first explain what is inside the control box K, and for this purpose I shall refer to Figs. 3–10. The keys A-E being of identical construction, a description of one will suffice for all. Each key comprises a shank 20 provided with a recess 21, a hump or cam projection 22, and a lateral offset 23. For convenience of manufacture, the shanks 20 can be punched from sheet metal. It will simplify the description if I use the reference numeral 20 to indicate the keys generally, and the letters A-E shall be used when a particular key is to be identified. Referring to Fig. 7, each key 20 has a head 24, which is riveted in place or otherwise rigidly attached. The head 24 is a cup-shaped member of sheet metal and carries a disk 25 on which a selected station is identified, as will be seen in Fig. 3. The disk 25, which may be a piece of paper, celluloid, fiber, or other material suitable for receiving notations, is removably mounted on the key head 24 by a cap 26 adapted to be forced over the same. The cap 26 may be sheet metal, celluloid, fiber, vulcanized rubber, or any other suitable material having sufficient resiliency to grip the head 24 in a tight and yet releasable frictional engagement. Instead of using a separate disk 25, which shows through the center opening of cap 26, these two parts may be combined in a single member, as shown at 27 in Fig. 9. The cap 27 has an integral top 28, which serves the same purpose as the disk 25 of Fig. 7.

The keys 20 are supported and guided for vertical movement in a bar 29, which is suitably attached at its ends to the sides 30 of the control box. The bar 29 is here shown as a channel bar shaped from sheet metal and provided at each end with extensions 31 bent downwardly to receive fastening members 32, as best shown at the right of Fig. 10. The keys 20 pass through transverse slots 33 in bar 29, and the parallel upright sides of the bar act like guide members for the keys in their down and up movement. Additional guiding means for the keys 20 is afforded by the top 34 of the control box, this top being provided with slots 35 through which the flat shanks 20 of the keys pass in a close fit, but sufficiently loose for free movement.

A rod or shaft 36 is supported at its ends in a pair of brackets or bearing hubs 37 secured to the sides 30 of the control box K, and on this shaft are mounted rotatable sleeves 38, each of which carries a lever 39. The sleeves 38 are independently movable and hold the levers 39 in properly spaced relation on shaft 36. Each lever 39 is provided at its front end with a slot 40 adapted to receive a pin 41 carried by the associated key 20, whereby the downward movement of a key throws the rear end of the connected lever upward, and vice versa. As seen in Fig. 10, the levers 39 are connected to the lateral offsets 23 of the keys, so that the keys and levers may be arranged in alignment. This, however, is not the main purpose of the lateral offsets 23 of keys 20, as will be understood later on. Back of the transverse shaft 36 is a fixed rod 42 supported at its ends in brackets 43, which are attached to the sides 30 of the control box in any practical way. A contracting coil spring 44 is connected at 45 to the rear section of each lever 39, and the lower end of the spring is connected at 46 to the bottom 47 of the control box. The springs 44 normally hold the rear end of levers 39 against the fixed stop bar 42, as shown in Fig. 4. This means that the keys 20 are normally held in raised or uppermost position by the tension springs 44.

A bar 48 is mounted between the sides 30 of control box K, as by means of brackets 49 or otherwise. A series of switch arms 50 of curved spring metal are attached at their lower ends to the cross-bar 48 and spaced in alignment with the pivoted levers 39, as will be understood from Fig. 10. Each switch arm 50 has a cam portion 51 arranged to be engaged by the rear end of lever 39 when the latter is rocked upward on depression of a key. By comparing Figs. 4 and 5, it will be seen that, when the rear end of lever 39 is raised, the associated switch arm 50 is forced rearward at its upper end into contact with a conducting bar 52, which is supported on brackets 53 or otherwise between the sides 30 of the control box. The bar 52 may be formed as a channel bar of thin sheet metal, such as brass. The bars 48 and 52, which can be mounted on a single frame or on one pair of brackets, are connected in circuit and serve as common terminals for the individual switch arms 50. It is assumed that the control box K is of insulating material, like wood, bakelite, and so on. If the box is made of metal, the bars 48 and 52 must be insulated from each other. In Fig. 10, conductors 54 and 55 are connected to the bars 48 and 52, respectively. When any one of the switch arms 50 is moved into contact with bar 52, the latter is electrically connected with bar 48. In other words, the fixed bars 48 and 52 and the movable spring arms 50, which are arranged in parallel between the bars, constitute a normally open switch adapted to be closed when any key is depressed.

A cross-bar 56 mounted on brackets 57 between the sides of the control box carries a series of switch arms 58 arranged in line with the keys 20. The switch arms 58 are in the form of spring fingers having a rearwardly extending cam portion 59 arranged to be engaged by the projection 22 of the associated key when the latter is depressed. If the bar 56 is of metal, it is necessary to insulate the spring fingers 58 from each other. The upper end of each spring finger 58 is in the form of an extension 60 (see Fig. 4) for attaching a conductor. An L-shaped bar 61 of insulating material is secured to the bottom 47 of the control box by screws 62 or otherwise. A contact strip 63 of brass, or other good conducting metal, is mounted on bar 61 by screws or bolts 64, one of which may act as a binding post for a conductor 65 to connect the contact strip 63 in circuit. The spring fingers 58 are normally held by their inherent tension out of contact with strip 63. When a key is depressed, the cam projection 22 engages the cam portion 59 of the associated spring finger 58 and forces the latter into contact with the conducting strip 63, as shown in Fig. 5.

Attention is called to the fact that when a key is pushed down, the spring member 58 is closed in advance of the switch member 50. This will be understood by reference to Fig. 4, where the dotted outline 20' indicates the position of a key when depressed sufficiently to close the switch member 58 while the switch member 50 is still open. The dotted outline 39' indicates approximately the position of the rear end of lever 39 when the key has been depressed to the position indicated at 20'. The switch members 50 are so shaped that the cam portion 51 is forced rearward by the actuated lever 39 only after the associated switch member 58 has been moved into contact with the conducting strip 63. The object of closing the switch member 58 ahead of the switch member 50 whenever a key is pushed down, will be explained when I describe the electromagnetic mechanism for actuating the tuning shaft in accordance with the depressed key to bring in the selected station.

A contact bar 66 is mounted on an insulating strip 67 in vertical alignment with the keys 20. The supporting strip 67 is secured to the base 47 of the control box. A second bar 68 is mounted to the rear of bar 66 on a suitable insulating support 69. The supports 61, 67, and 69 can easily be made as one member, either as a casting, or a sheet metal stamping, or as a frame molded from bakelite or like material. If this member is of metal, the supported contact bars 63, 66, and 68 will obviously have to be insulated. It is evident from Figs. 4, 5, and 6 that the five contact bars 48, 52, 63, 66, and 68 may be attached to a single L-shaped frame inserted as a unit into the control box after the switch parts have been mounted on the frame. This facilitates the work of assembly. Spring fingers 70 are fixed at their rear ends on the common conducting bar 68, and the front ends of these fingers extend beneath the keys 20. The spring fingers 70 are normally by their inherent tension out of contact with bar 66. When a key 20 is fully depressed, as shown in Fig. 5, the associated switch arm 70 is pushed down into contact with bar 66, whereby the latter becomes electrically connected with bar 68. It should be noticed that the switch member 70 is not closed unless and until the key is pushed down to its fullest extent, which occurs after the switch member 59 has been moved into contact with bar 63, as previously explained. The spring fingers 70 constitute a series of normally open connections arranged in parallel between the bars 66 and 68, so that the switch constituted by the members 66, 68, and 70, is closed whenever any one of the spring fingers 70 is moved into contact with bar 66.

When a key is pushed down, it is automatically locked against full return movement by a bar 71 slidably mounted on supports 72, which may be a pair of posts secured to the base of the control box by screws or bolts 73, as may be seen in Fig. 10. The bolts 73 pass through longitudinal slots 74 in bar 71 to permit movement of the bar transversely of the control box for locking and releasing the keys. The bar 71 is provided with lateral slots 75, one for each key. When the bar 71 is in normal position, the slots 75 are in alignment with the lower ends of keys 20, as shown in Fig. 10. Therefore, when a key is depressed, its lower end passes through the aligned slot 75 of bar 71. When the bar 71 is shifted to the left from the position shown in Figs. 3 and 10, the slots 75 are moved out of alignment with the keys 20, so that the keys are locked in normal raised position, with the exception of the depressed key which is locked by the bar against return movement. This will be understood from Figs. 5 and 6. Fig. 5 shows one of the keys 20 in fully depressed position. As will be presently explained, when the switch 70 is closed, certain electromagnetic mechanism is energized to move the bar 71 to locking position. Consequently, when the depressed key is released, it can only move up a slight distance—that is to say, until the shoulder 76 of recess 21 strikes the bottom of bar 71. The purpose of allowing a slight upward movement of the depressed key before it is locked by the bar 71 is to open the switches 50, 58, and 70 to prevent waste of current. This practical advantage will be fully appreciated when the operation of the apparatus is described.

The key-locking bar 71 is operated by a bellcrank or right-angled lever 77 pivoted at 78 on a post 79 projecting upwardly from the base of the control box. One end of bar 71 carries a pin 80 which extends through a slot 81 in the bellcrank 77. The short arm of this bellcrank carries an armature 82 arranged to project between a pair of electromagnets 83 and 84, which are mounted on brackets 85 secured to the bottom of the control box. For brevity I shall refer to the electromagnets 83 and 84 as coils, it being understood that these coils are provided with magnetic cores to concentrate the flux which acts upon the armature 82. It is evident from Fig. 3 that, when coil 83 is energized, the bellcrank 77 is rocked into the dotted line position 77', and the bar 71 is shifted to the left into locking position. When the other coil 84 is energized, the bellcrank 77 is moved back to normal position and pulls the bar 71 to the right until the slots 75 are in line with the keys. Whenever the bar 71 is moved from locking to releasing position, the previously depressed key (see Fig. 6) automatically snaps up to normal position under the action of spring 44.

To summarize the action of the locking bar 71: whenever a key is fully depressed, the switch arm 70 closes the circuit through coil 83, which actuates the bellcrank 77 to move the bar 71 into locking position, so that the raised keys cannot now be pushed down. This prevents interference with the operation of the automatic tuning mechanism after a key is pushed down to bring in a selected station. When the depressed key is released by the operator, it moves up slightly (compare Figs. 5 and 6) and is locked in this intermediate position by the bar 71. The depressed key also indicates to the operator which station has been tuned in, independently of the lighted window 19, to which reference was made in connection with Fig. 1. The restoring coil 84 is energized to return the locking bar 71 to normal position when the main switch 18 is thrown open or to "off" position, as will later be fully described.

As previously mentioned, the control box K is provided on top with a series of windows 19 arranged back of the keys. The structural details of these windows are shown in the enlarged view of Fig. 8. Each window is formed by a cylindrical extension 86, which is covered by a disk 87 held in place by a spring cap 88. If the cover 34 of the box is made of sheet metal, the window extensions 86 can be stamped or punched out as integral projections of the cover. The disks 87 may be of paper, celluloid, or any transparent or translucent material adapted to receive writing for indicating thereon the station represented by the associated key. This is illustrated in Fig. 3. The cap 88, which has a circular hole for displaying the disk 87, may be stamped from sheet metal, celluloid, rubber, or any other material adapted to engage the window projection 86 in a tight frictional engagement that permits removal of the cap. Instead of making the disk 87 separate from the cap 88, these two parts may be formed as a single member, similar to the key cap 27 in Fig. 9. Behind each window 19 is a lamp 89 mounted on a shelf 90, which may simply be an L-shaped bar of sheet metal attached to the inside of the cover 34, as shown in Figs. 4, 5, and 6. The sockets 91 of the lamps are mounted on shelf 90, and conductors 92 connect each socket in circuit, so that the lamps can be controlled individually by the associated key, as will later be explained. The light-transmitting disks 87 may be differently colored to heighten the optical effect, especially if the control box is in the dark. Also, the use of selected colors for the windows serves as an additional means for identifying the various stations.

The next thing to describe is the electromagnetic mechanism mounted in the radio cabinet R for actuating the tuning shaft by merely pushing down one of the keys A–E of the control box. This mechanism is shown in Figs. 2 and 11—13, to which I shall now refer. The radio receiving apparatus in the cabinet R has a rotary condenser shaft 93 for adjusting one or more condensers 94. Only one of these condensers is shown in Fig. 2, but it will be understood that the shaft 93 operates as many condensers and other tuning devices as are necessary in any particular radio receiver to bring in a desired station. In other words, the rotary shaft 93 is to be regarded as representing broadly any type or construction of tuning means for a radio receiver. At the present time the most popular style of radio set has only a single tuning knob which operates a gang of condensers. The radio set illustrated in Fig. 1 may be assumed to be of that type, so that the knob 12 is operatively connected to the tuning shaft 93 to adjust the same by hand when desired.

The condenser shaft 93 is supported in suitable bearings, one of which is shown at 95 in Fig. 2, and the shaft carries a series of radial arms 96, one for each key A–E of the control box. The arms 96 are in predetermined angular relation to each other, each arm representing a selected station. The angular position of each arm 96 depends upon the position which the condenser shaft must occupy to bring in the station represented by that arm. It is desirable that the arms 96, while rigidly mounted on the condenser shaft 93, should be adjustable radially thereon, so that a particular radio receiver can easily be calibrated in the factory and by the owner for certain selected stations. Figs. 20 and 21 show a novel mounting to permit easy adjustment of the radial arms 96. Since the mountings for all arms are the same, a detailed description of Figs. 20—21 is supposed to apply to all the radial arms 96. Each arm has a housing 97 formed with side slots 98 to permit mounting of the housing on shaft 93. The housing 97 encloses a worm gear 99 fixed on shaft 93 by pin 100 or otherwise. A worm shaft 101 is rotatably mounted in housing 97 and is permanently in mesh with worm gear 99. A knurled knob 102 at one end of worm shaft 101 permits easy rotation of the latter in either direction. The rounded ends 18' of slots 98 act like rotary bearings and hold the housing 97 firmly seated on shaft 93. It is clear from Fig. 20 that rotary adjustment of the worm shaft 101 causes corresponding radial adjustment of the arm 96 on shaft 93. The connection between gear 99 and worm gear 101 permits adjustments of micrometer fineness and is such that the arm 96 is always locked rigidly to the tuning shaft. In other words, when the arm 96 has been adjusted to the desired angular position on shaft 93 by turning the knob 102 one way or the other, the arm 96 is automatically locked in adjusted position without attention by the operator. It is understood that the engagement between the teeth of gear 99 and the worm thread on shaft 101 is practically free from loose play. The arm 96 and housing 97 can be cast as a single piece, preferably from aluminum or aluminum alloy, which is light and strong.

Referring to Fig. 2, there is a sleeve or hub 103 projecting horizontally from the side wall 104 of the radio cabinet R. The sleeve 103 is formed with a base or enlargement 105 adapted to receive screws or bolts for securing the sleeve rigidly in place. A rotary shaft 106 (see Fig. 11) is mounted in sleeve 103 and the outer end of this shaft carries a pair of gear wheels 107 and 108, which may be cast as a single member or secured together as two separate parts. The small gear 107 meshes with a reciprocable rack bar 109 connected at its ends to a pair of magnetic cores 110 and 112, which are operatively associated with coil 113 and 114, respectively. Each coil and its movable magnetic core constitute a solenoid. Since the cores 110 and 112 are always supported in the center openings of coils 113 and 114, no separate support is necessary for the rack bar 109 to hold it constantly in mesh with the small gear 107. If desired, however, a separate bracket 115 may be fixed on the base 116 of cabinet R to hold and guide the rack bar 109 in its movements. The cylindrical cores 110 and 112 are made of magnetic metal having a high degree of permeability, but the rack bar 109 is made of non-magnetic metal, such as brass, aluminum and the like. It is clear from Fig. 11 that, when the coil 113 is energized, the core 110 is pulled in and the rack bar 109 is moved to the left, whereby the gears 107 and 108 are rotated clockwise. Conversely, when the coil 114 is energized to pull in its core 112, the rack bar 109 is pulled to the right and the gears 107 and 108 are turned the other way. The coils 113 and 114 are rigidly held in axial alignment by any practical form of mounting. In Fig. 11, I have shown a pair of L-shaped brackets 117 to which the coils are connected. The brackets 117 are preferably non-magnetic and may be secured to the bottom of the radio cabinet.

The large gear wheel 108 has a peripheral section 118 which has no teeth and may therefore be called an inoperative section. The teeth of gear 108 are adapted to engage the teeth of a small gear 119 fixed on the condenser shaft 93. An arm 120 on shaft 93 is arranged to engage a fixed stop 121 for holding the shaft in normal or neutral position. The arm or projection 120 is rigidly mounted on shaft 93, but radial adjustment of the arm is permitted by a set-screw 122. The stop 121 may be in the form of an L-shaped bracket secured to the side 104 of the radio cabinet, as shown in Fig. 2. At one end of the toothless or inoperative section 118 of gear wheel 108 is a projection 123 normally engaging a fixed stop 124, which is carried by a post 125 attached to the bottom of the cabinet. When the tooth or projection 123 strikes the stop 124, the large gear 108 has reached the limit of its counter-clockwise movement. This position of gear 108 may be called its normal or inoperative position, because its teeth are then out of engagement with the small gear 119 on shaft 93. It is evident, therefore, that when the large gear 108 is in normal position (or in other words, when the control box K is not in use), the condenser shaft 93 is free to be operated by the hand knob 12 (see Fig. 1) to bring in any desired station independently of the control box. This feature is of practical advantage, because it leaves the radio set always in condition to be tuned by hand in the usual way, the same as if the control box K and the associated operating mechanisms were absent.

The projection 123 on gear wheel 108 is normally held against the fixed stop 124 by a contracting coil spring 126, one end of which is attached to a pin 127 projecting laterally from the gear, as shown in Fig. 2. The lower end of spring 126 is attached to the bottom of the cabinet at 128 in any practical way. The connecting points 127 and 128 of spring 126 are such that normally the line of pull of the spring is to the left of shaft 106, so that the tension of the spring holds the projection 123 firmly against the stop 124. When the coil 113 is energized to turn the gear 108 clockwise, the tensioned spring assists the action of the coil as soon as the connecting point 127 crosses the neutral line 129. In other words, as soon as the axis of spring 126 moves to the right of the imaginary line 129, the spring pulls the gear wheel 108 clockwise independently of coil 113. This assures the complete movement of gear 108 and the connected parts, even if the coil 113 should be de-energized prematurely by release of the depressed key.

Assuming the parts to be in normal position, as illustrated in Fig. 11, it will be seen that when the operating coil 113 is energized by pushing down a key, the large gear 108 is rotated clockwise and moves into mesh with the small gear 119 on condenser shaft 93, so that the latter is rotated counter-clockwise to throw the radial arms 96 forward. The transmission ratio between the rack bar 109 and the gear wheel 119 is such that the linear movement of the bar produces sufficient rotation of condenser shaft 93 to tune in any one of the stations represented by the arms 96. In the present instance, it has been assumed that the maximum movement of the condenser shaft is 180 degrees, or half a revolution. If the radio receiver is such that its tuning shaft requires a complete revolution to adjust the condenser or condensers from minimum to maximum capacity, it is a simple matter to arrange the driving connections for shaft 93 so that the maximum movement of rack bar 109 will produce one revolution of the tuning shaft.

The movements of condenser shaft 93 are controlled by a series of adjustable stops 130 adapted to be moved into and out of the path of travel of the radial arms 96, which are in alignment with the stops, as seen in Fig. 2. In the present embodiment, the stops 130 are in the form of slidable bars, each of which is pivoted at 131 to the lower end of a lever 132 (see Fig. 11). These levers are pivoted for independent movement on a rod 133 carried by a pair of arms 134, which extend rearward from a suitable frame 135 rigidly supported in the radio cabinet. Sleeves or bushings 136 on rod 133 hold the levers 132 properly spaced, as will be clear from Fig. 2. Each lever 132 carries an armature 137 arranged to extend between a pair of coils 138 and 139. The armatures 137 extend substantially at right angles to the levers 132, so that each lever and its connected armature constitute a bellcrank pivoted at its apex on the common supporting rod 133. Each lever and its armature can be cast as a unit from magnetic metal, or they can be stamped or punched out from magnetic sheet metal as a single piece. If desired, however, the levers 132 may be formed of non-magnetic material separate from the armatures 137 and operatively connected thereto in any practical way. The coils 138 and 139 are supported on brackets 140 projecting from the frame 135. A spring finger 141 is associated with each armature 137 to hold the same in lower and upper position against (or close to) the magnetic core of coil 138 and coil 139. For this purpose, the spring finger 141 has a bevelled or cam-shaped projection 142 arranged to engage the free end of armature 137. The spring finger 141 is sufficiently resilient to be pushed out of the way by the armature as the latter moves from one position to the other. But after the armature has reached upper or lower position, the projection 142 of spring arm 141 holds the armature firmly in place. The purpose of this arrangement is to hold the slidable stops 130 either in normal withdrawn position, or in their operative position when projecting into the path of the radial arms 96 on tuning shaft 93. The stops 130 are guided in their sliding movements between a pair of spaced rods 143, which are mounted at their ends in arms 144 of the supporting frame 135, as shown in Figs. 2 and 11.

The stops 130 are normally withdrawn, so as to be out of the path of the radial arms 96 on shaft 93, as will be clear from Fig. 11, where the dotted circle 96' represents the path of the arms. When one of the coils 138 is energized (through connections that will later be explained), the associated armature 137 is pulled down and the lever 132 is rocked rearward to throw the connected stop 130 into the path of the aligned arm 96. In Fig. 2, the dotted outline 130' indicates roughly the operative position of one of the stops 130. It is clear that, when a particular stop is moved rearward, the rotation of condenser shaft 93 is interrupted the moment one of the arms 96 strikes the operative stop. The rods 143 at the free end of each stop bar 130 cooperate with the pivot bearings 131 and 133 to hold the bar rigid when the arm 96 strikes it, so that the shaft 93 is definitely stopped in correct tuning position. Although the stops 130 are arranged in horizontal alignment, the amount of movement of the tuning shaft 93 depends upon the particular stop that is moved to operative position, this movement being predetermined by the angular position of the particular radial arm 96 that encounters the operative stop. It is supposed that the arms 96 are so arranged on shaft 93 as to adjust the condenser or condensers to the different capacity values required for the selected stations. Each stop 130 is controlled by one of the keys A—E of control box K. Consequently, by pushing down the key that represents the desired station, the operator automatically sets up a corresponding stop 130. Only one stop is set up at a time, because it is supposed that the operator will push down only one key. As previously explained, after one key has been actuated, the other keys are automatically locked, so that there is no danger of a second stop 130 being set up while the first stop is still in operative position. Since the coils 138 throw the stops 130 rearward into operative position, I shall call them the setting-up coils. The coils 139 may be termed the restoring coils, because they withdraw the stops 130 to normal inoperative position.

In the particular embodiment of the operating mechanism illustrated in Figs. 2 and 11, it is desirable to provide means for compelling the condenser shaft 93 to be in normal position when the radio set is tuned from the remote control box. As already explained, the condenser shaft 93 is always in condition to be operated by the knob 12 for manual tuning in the usual way. It may happen that, after thus tuning the set by hand, a person will leave the condenser shaft 93 in actuated position. If, in that event, some other person should want to use the control box to bring in a certain station, the condenser shaft would not be actuated by the electromagnetic mechanism to proper position. Since the radial arrangement of the arms 96 on shaft 93 presupposes that this shaft will always start from the same position, it follows that the condenser shaft must always be in the same position when the large gear 108 moves into engagement with the small gear 119. Therefore, to assure the proper operation of the remote control mechanism without regard to the position in which the condenser shaft may have been left after a manual tuning of the receiver, I provide means for automatically restoring the condenser shaft to normal position before the coil 118 is energized to rotate the shaft. I shall now describe this automatic restoring mechanism, which is best shown in Figs. 2, 12, and 13.

The condenser shaft 93 carries a pinion 145 adapted to mesh permanently with a rack bar 146, which is attached to (or otherwise connected with) a solenoid core 147 associated with a magnetizing coil 148. The rack bar 146 is held in engagement with the teeth of pinion 145 by a supporting and guiding bracket 149, which may conveniently be secured to the bottom 116 of the radio cabinet. The coil 148 is mounted on a post or bracket 150 projecting upwardly from the base of the cabinet, or otherwise supported. A ring 151 of insulating material is supported on brackets 152 in concentric relation to the condenser shaft 93. Two circular conducting strips 153 are embedded in or otherwise secured to the inside of ring 151, which may be molded of bakelite or other insulating material. The contact strips 153, which may be shaped from strips of brass, are arranged diametrically opposite, being separated by the insulating material of ring 151 at points 154. A switch arm 155 fixed on condenser shaft 93 rotates inside the ring 151. The opposite ends of arm 155 carry contact pieces 156, which are constantly pressed outward by coil springs 157 arranged in recesses in the arm. The contact pieces 156 may be small blocks of carbon adapted to make good electrical contact with the arcuate strips 153 as the arm is rotated. The angular position of switch arm 155 on shaft 93 is such that, when the shaft is in normal position (that is, with the projection 120 engaging the stop 121 as illustrated in Fig. 11), the switch arm 155 is out of contact with both conducting strips 153, as will be clear from Fig. 12. However, when the condenser shaft is out of normal position, the switch arm 155 engages the strips 153 and thereby closes the circuit through coil 148. These circuit connections will presently be explained in the description of Fig. 14. When the coil 148 is energized, the rack bar 146 is drawn forward (to the left, as viewed in Fig. 13), and the condenser shaft 93 is turned rearward until the projection 120 strikes the stop 121, whereby the shaft is restored to normal position. When this occurs, the switch arm 155 is out of contact with strips 153, and the circuit through coil 148 is automatically interrupted. A pair of binding posts 156 on ring 151 permit circuit conductors to be readily attached to the contact strips 153.

The circuit connections for the electromagnetic mechanisms above described are diagrammatically indicated in Fig. 14. To promote clearness in this drawing, the mechanical parts are illustrated by diagrammatic outlines and have been purposely spread apart to prevent confusion of lines. The main switch 18 is shown as a toggle lever pivoted at 159 in the control box and extending out of the box through a slot 160, which also serves to limit the movements of the switch to "on" and "off" position. The lower end 161 of switch lever 18 engages a cam projection or rounded hump 162 on a spring finger 163, the normal tendency of which is to press against the lever and hold it in "on" and "off" position. The spring finger 163 is connected by insulating posts or blocks 164 to the free ends of similar spring fingers 165 and 166. Contact arms 167, 168, and 169 are associated with the spring fingers 163, 165, and 166, respectively, to form three switches adapted to be simultaneously opened and closed by the toggle lever 18. A lateral extension 170 on lever 18 controls a switch represented by a pair of normally open spring contacts 171. Conductors 172 connected to switch 171 lead to the radio receiver R for closing its supply circuit or circuits, such as the filament circuits, rectifier circuits, etc. The switch 171 is arranged in parallel with the main switch 15 of radio receiver R, so that the closing of either switch puts the set in operative condition. It should be noted that the switch arms 163, 165, and 166 are open in either position of the toggle switch lever 18, but these switches are closed by being pushed down against contact arms 167, 168, and 169, respectively, when the lower end of the lever rides over the highest portion of the hump or cam 162 on spring arm 163. The purpose in leaving the switches open when the arm 18 is in "on" and "off" position is to prevent waste of current, as will more clearly appear later on. The switch 171, however, remains closed as long as the toggle lever 18 is in "on" position. The hump or cam 162 is so shaped that the switch arms 163, 165, and 166 remain closed long enough during the throw-over movement of lever 18 to allow the associated electromagnetic devices to perform their intended functions.

In Fig. 14, it has been assumed that the source of current supply is the house-lighting circuit, to which connection is made by simply inserting a plug 173. If the lighting circuit is fed by alternating current, it will be necessary to use a rectifier, of which several types are available in the market. The outline 174 represents a suitable form of current rectifier. Of course, the leads 175 and 176 may be connected to a battery or other source of direct current having the required voltage and amperage for properly operating the various electromagnetic devices previously described. One end of the operating coil 113 is connected by conductor 54 to the common contact bar 48, which is here represented by a line. It will be remembered (see Figs. 4 and 10) that the bar 48 serves as a common support for the individual switches 50. This mounting is shown diagrammatically in Fig. 14 by connecting wires 48'. The other end of coil 113 is connected by wires 177 and 178 to the supply conductor 175. I might as well explain at this point that, when I refer to any of the connections in Fig. 14 and the other diagrams as "wires", I use this term in its broadest possible sense to indicate any practical form of electrical connection, whether made by wires, strips, bars, plates, or other means. To facilitate the description of Fig. 14, the key-operated switches 50 are differentiated by the suffix letters a–e, which correspond to the key letters A–E. In other words, when key A is pushed down, it closes switch 50a; key B closes switch 50b; and keys C, D, and E close, respectively, switches 50c, 50d, and 50e. In the same manner I have distinguished the switches 58 and 70, the arms 96 on shaft 93, the stops 130, and the setting-up coils 138. The suffix letters attached to these reference numerals indicate that the parts thus designated are controlled by keys having letters corresponding to the suffixes. For example, when key B is depressed, it closes switches 50b, 58b, and 70b, and energizes coil 138b to move stop 130b into operative position to engage the radial arm 96b of condenser shaft 93. In this way it is easy to identify in Fig. 14 the different parts that come into play when a key is depressed.

Still referring to Fig. 14, it will be seen that the restoring coils 139 are connected in parallel to the two conductors 179 and 180. Conductor 179 is connected to the main lead 176, and conductor 180 is connected to the switch arm 165. Consequently, whenever the switch lever 18 is thrown from "off" to "on" position, all the coils 139 are energized, and the previously actuated stop 130 is withdrawn to normal inoperative position. This restoring circuit is also closed when the toggle lever 18 is thrown from "on" to "off" position, but that is merely an incidental operation which is not necessary, for it is sufficient that the restoring coils 139 are energized when the switch lever 18 is thrown off to open the supply circuit. The setting-up coils 138 are connected at one end in parallel to a conductor 181, which is connected through wire 178 to the side 175 of the supply circuit. The other ends of coils 138 are connected to the key-operated switches 58a–58e by conductors 182a–182e, respectively. That is to say, coil 138a is connected by wire 182a to switch 58a; coil 138b is connected by wire 182b to switch 58b; and so on for the other setting-up coils. As explained in connection with Figs. 4, 5, and 6, the individual switches 58 have a common contact bar 63, which is shown in Fig. 14 as a conductor 63 provided with contact extensions 63' for engagement with the spring fingers that represent the switches 58. The common conductor 63 is connected by a wire 183 to the supply main 176. Consequently, when any one of the keys A–E is pushed down, the associated switch 58 is closed to connect the corresponding coil 138 in circuit. For illustration, let us suppose that key B has been pushed down. The circuit through setting-up coil 138b is traced in this way: From lead 175 through wires 178 and 181 to coil 138b, thence through wire 182b to switch member 58b which is now in engagement with the common contact bar 63, and from here through wire 183 to the other side 176 of the supply circuit. The circuit through each of the other coils 138 can be traced in like manner when the corresponding key is depressed.

The conductor 68 in Fig. 14 represents diagrammatically the conducting bar 68 of Figs. 4, 5, and 6. It will be remembered that the bar 68 is not only a common support for the switch members 70, but also acts as a common electrical connection for the same. This construction is diagrammatically indicated in Fig. 14, where the switch members 70a–70e are electrically connected by wires to the common conductor 68, which in turn is connected to conductor 179 by a wire 184. The common contact bar 66 of Figs. 4, 5, and 6 is represented in Fig. 14 by a conductor 66 provided with contact extensions 66' for engagement by the switch members 70a–70e. When any one of the switches 70 is closed by a depressed key, the coil 83 is energized to move the bar 71 into locking position. This circuit can be traced as follows: From supply main 175 through wires 178 and 185 to coil 83, from there through wire 186 to the common contact bar 66, then through the particular switch 70 that was closed by the depressed key, to the common contact bar 68, and finally through wires 184 and 179 to the other side 176 of the supply circuit. No matter which of the switches 70a–70e is closed, the circuit through coil 83 is established through the connections that have just been traced.

When any one of the switches 50a–50e is closed by the actuation of the associated key through the pivoted lever 39, the circuit through the operating coil 113 is closed through the following connections: From the main lead 175 through wires 178 and 177 to coil 113, thence by wire 54 through the closed switch 50 to the common contact bar 52, through wire 55 to the connecting point 187, and from there through the common return conductor 179 to the other side 176 of the supply circuit. It is thus clear that no matter which one of the key-controlled switches 50a–50e is closed, the coil 113 is energized to rotate the condenser shaft 93 in the manner previously explained.

I have already mentioned that the function of coil 114 is to restore the condenser shaft 93 to normal position through the reverse operation of the gear connections 109, 107, 108, and 119. The circuit through restoring coil 114 is automatically closed when the main switch 18 is thrown from "on" to "off" position. Let us suppose that the switch lever 18 is about midway of either final position and closes the switch arms 163, 165, and 166. The closing of these three switches automatically energizes the three restoring coils 114, 84, and 148, respectively. The circuit through coil 114 is established thus: From the main lead 175 through wires 178 and 177 to coil 114, by wire 188 through the closed switch members 163 and 167, and through wire 189 to the other side 176 of the supply circuit. The energizing of coil 114 rotates the large gear 108 counterclockwise (as viewed in Figs. 11 and 14) until the projection 123 strikes the fixed stop 124. This does not occur until after the gear 108 has moved the condenser shaft 93 back to normal position through the small gear 119. It was previously explained that when the large gear 108 is in normal position, it is out of mesh with the small gear 119 on shaft 93, so that the latter is free to be turned by hand in the usual way.

The function of coil 84 is to restore the locking bar 71 to normal or releasing position. It has already been described (see Fig. 3) that, when the coil 84 is energized, the lever 77 shifts the bar 71 from locking to normal position by bringing the transverse slots 75 of the bar into line with the keys A—E. This restoring operation of bar 71 takes place automatically when the switch arm 18 is thrown from "on" to "off" position. The circuit through coil 84 is traced as follows: From supply lead 175, through wires 178 and 185 to coil 84, through wire 190 across the closed switch contacts 168 and 165, through wire 180 to coils 139 in parallel, and thence through return lead 179 to the other side 176 of the supply circuit. For convenience the coil 84 has been connected in series with the coils 139, but it is evident that the circuit through coil 84 may be closed independently of coils 139.

When the main switch 18 closes the switch contacts 166 and 169, coil 148 (see top of Fig. 14) is energized to restore the condenser shaft 93 to normal position. This particular operation is not necessary when the switch 18 is thrown from "on" to "off" position to disconnect the control box from the radio receiver, because the coil 114 restores the condenser shaft to normal position. The practical utility of the restoring mechanism operated by coil 148 resides in the assurance that the condenser shaft will always be in normal position when the operating coil 113 is energized on the depression of a key. When the switch 18 is moved from "off" to "on" position to connect the radio set and the control mechanism with the supply circuit, there is no movement of condenser shaft 93 if the latter is already in normal position. That is so, because under those conditions the switch arm 155 is out of contact with the terminal strips 153, as shown in Fig. 12. However, should the condenser shaft 93 be out of normal position when the main switch 18 is closed, as may happen if the shaft was previously tuned by hand, the coil 148 is energized to actuate the rack bar 146 and thereby rotate the shaft 93 until the projection 120 strikes the stop 121. The circuit through coil 148 is closed as follows: From supply lead 175 across the closed switch members 166 and 169, through wire 191 to coil 148, through wire 192 across the closed switch 153–155, through wire 193 to point 187, and from there through the common return 179 to the other side 176 of the supply circuit.

For convenience I shall append the following summary of the various operations that take place in the system of Fig. 14 when a key is depressed. For illustration we may select key D. The first switch to be closed when the key is pushed down is switch 58d, which closes the circuit through setting-up coil 138d, whereby the stop 130d is moved backward into operative position. As the key is pushed down farther, the switches 50d and 70d are closed. The switch 50d closes the circuit through the operating coil 113, which rotates the condenser shaft 93 until the arm 96d strikes the stop 130d, whereupon the condenser shaft is stopped. When this happens, the radio set is in tune with the wave length on which the selected station broadcasts. As previously explained, the arms 96 on tuning shaft 93 are supposed to be so adjusted as to tune the radio set for the different stations that have been selected when these arms strike the associated stops. The closing of switch 70d energizes coil 83, which shifts the bar 71 to locking position, so that the raised keys cannot be pushed down and key D is locked against return movement. The importance of closing switch 58 in advance of switch 50 when a key is depressed, will now be fully understood. It is necessary that the stop bar 130 be set up by energizing its coil 138 before the operating coil 113 is energized to rotate the condenser shaft 93, so as to make sure that one of the arms 96 will strike the appropriate stop and tune the receiver.

When the operator wants to turn off the set, he throws the switch 18 to "off" position, whereby the restoring coils 84, 114, and 139 are energized to restore, respectively, the locking bar 71, the condenser shaft 93, and the actuated stop 130, to normal position. The coil 148 will also be energized, but at this time it will merely aid the coil 114 to turn the condenser shaft backward until the gear 108 passes out of mesh with gear 119. If at that moment the arm 119 on shaft 93 does not engage the stop 121, the coil 148 imparts the final movement to the shaft and thereby assures its return to exact normal position. The entire mechanism is now in condition to operate when the next controlling key is actuated. It is thus clear that a person need not do anything more than merely push down a key in order to bring in a selected station on his radio set. The control box K can be located at any convenient place away from the radio cabinet. A person may have the control box before him on a table, or on the arm of a reclining chair, and an invalid may have the box in bed. In other words, wherever a person is comfortably seated or lying down, he can have the control box within easy reach to operate his radio receiver through no greater exertion than pushing down a key. The control box K, which need not be much bigger than a cigar box, can be made as pleasing and artistic in appearance as desired. Of course, the control box could be mounted on the radio cabinet itself, or even made a part thereof, but the greatest advantage of this invention from the standpoint of convenience resides in the remote control feature.

I have stated that the control box K may be provided with windows 19, one for each key, so that when a key is pushed down, the corresponding window is automatically lighted by an electric lamp 89 (see Figs. 4, 5, and 6). Each lamp circuit is controlled by a switch arranged to be automatically closed on the operation of a key. Each of these lamp switches consists of a fixed contact arm 194 and a movable contact arm 195, as best shown in Fig. 10. For convenience, these switch arms may be mounted on the channel bar 29, which serves as a guide and support for the keys 20. It is obvious that the lamp switches 194—195 should be insulated from each other. The movable switch arms 195 are in the form of spring fingers terminating in a lateral offset 23 of the adjacent key 20 when the latter is pushed down. In other words, when a key is depressed, the lateral offset 23 pushes the adjacent spring finger 195 against the associated contact 194 to close the circuit of the particular lamp that lights the window back of the depressed key.

The circuit connections for controlling the individual lamp circuits are diagrammatically represented in Fig. 14, where the key-controlled lamp switches 194—195 are shown for convenience at the right of the drawing. To distinguish the different lamps, I have indicated them by the reference characters 89a—89e, to show that lamp 89a is lighted when key A is pushed down, that lamp 89b is lighted by key B, and so on for the remaining lamps. For the same reason I have differentiated the switch arms 195 by the reference characters 195a—195e, respectively. The lamps 89 are connected in parallel to conductors 197 and 198, which are connected to the main supply leads 175 and 176, through wires 199 and 200. If desired, an adjustable resistance 201 may be inserted in the lamp circuit to regulate the voltage at which the lamps are fed. All the lamps are normally out of circuit. When a key is depressed, the corresponding switch 195 is closed and the lamp controlled by that switch is lighted. The lamp remains lighted until the key returns to normal position. It should be noted that the lamp circuit remains closed even after the depressed key has moved slightly upward before it is locked by the bar 71, as illustrated in Fig. 6. It is only when a depressed key is thrown up to normal position by the spring 44 that the lamp is extinguished. This notifies the operator visually that the control box is disconnected from the radio receiver.

The modification of Fig. 15 differs from the system of Fig. 14 mainly in employing an electric motor to operate the condenser shaft 93 instead of the solenoid driving mechanism previously described. The condenser shaft 93 of Fig. 15 carries at one end a magnetic armature 202 adapted to cooperate with a pair of electromagnets 203, which are energized by coils 204. The electromagnets 203 product a 4-pole field in which the pole pieces are arranged along two diameters at right angles to each other. The armature 202 is in the form of a cross whose arms register with the pole pieces of the field. The electro-magnets 203, which I shall hereafter call the field magnet, are rigidly mounted on a rotary shaft 205 in any practical way. Since Fig. 15 is intended to show the parts in diagrammatic outline only, for the sake of clearness, I have indicated the mounting of the field magnet 203 on shaft 205 by rods 206, which connect the field members 203 with a disk 207 fixed on the shaft. In actual practice, the field magnet 203 would be mounted directly on the non-magnetic disk 207, and the spacing rods 206 have been put in to permit a clear illustration of the other parts. The magnet coils 204 are connected in series to a pair of collector rings 208 by wires 209 and 210. A pair of brushes 211 and 212 engage the contact rings 208 to keep the circuit closed through the coils 204 during the rotation of shaft 205. An electric motor 213 has a shaft 214 carrying a pinion 215 arranged in permanent mesh with a gear wheel 216 fixed on the end of shaft 205, which is therefore connected to the motor in reduced transmission ratio. It is hardly necessary to explain that the gears 215 and 216 as outlined in Fig. 15 are not intended to indicate the correct gear reduction between shafts 214 and 205, but represent any practical driving connection between these two shafts.

The armature 202 and field magnet 203 constitute a magnetic clutch for operatively connecting the condenser shaft 93 to the driving motor 213. When the coils 204 are energized and the motor is running, the rotating field magnet 203 drags the armature 202 around with it, whereby the tuning shaft 93 is rotated. When the circuit through coils 204 is opened, the magnetic clutch becomes inoperative and the tuning shaft 93 stops, even though the shaft 205 may still be running. The circuit of the magnet coils 204 is controlled by two sets of switches 217 and 225. The individual switches of the first set are marked 217a to 217e, and the individual switches of the second set are marked 225a to 225e. For convenience, these two sets of switches may be referred to as a group by the reference numerals 217 and 225, respectively, and I have used the suffix letters *a–e* to indicate the association of these switches with the control keys A–E. The switches 217 comprise each a pair of normally open contact arms, one of which (marked 218) is connected to the associated switch arm 50 by an insulating pin 219, or in any other practical way. It is clear from Fig. 15 that when a key is depressed, the rear end of lever 39 not only closes the switch 50, but also the connected switch 217. The spring arms 218 of the switches 217 are connected in parallel to a common contact bar or conductor 219. The other terminals of switches 217 are connected in parallel to a common conductor 222, which is connected by wires 223 and 224 to collector brush 211.

The other switches 225a–225e for controlling the circuit of the magnet coils 204 are mounted on the adjustable stops 130. Since these mountings are alike, a description of one will be sufficient. Referring to Figs. 17 and 18, each stop 130 carries an insulating block 226 on which are mounted two contact arms 227 and 228. Each pair of these arms constitutes a switch 225. The arm 228 is in the form of a spring finger normally in contact with arm 227 and carrying at its free end an insulating pin 229, which projects through a hole 230 in the stop 130. When the associated arm 96 on condenser shaft 93 strikes the projecting pin 229, the spring finger 228 is forced out of engagement with arm 227 and the switch is opened. This happens just before the arm 226 strikes the actuated stop 130 to hold the condenser shaft in tuning position. The spring fingers 228 also act to some extent like buffers or shock-absorbers for the arms 96. The switches 225 are connected in series to a conductor 231, which is shown in Fig. 15 as a line divided into sections connected by the normally closed arms 227 and 228 of switches 225. The conductor 231 is connected by a wire 232 to the common conductor 219 of the switches 217. Although the switches 225 (contact arms 227 and 228) are normally closed, the circuit through the magnetizing coils 204 is not completed until one of the switches 217 is closed by operating the corresponding key. For example, when key D is pushed down, the circuit through coils 204 is closed through the following connections: From supply lead 221 through wire 235 to collector brush 212, through wire 210, coils 204 in series, wire 209, collector brush 211, through wires 224 and 223 to the common conductor 222, through closed switch 217d to point 234, through wire 219 to conductor 231 and the closed switches 225 in series, through wire 220 to point 233, and through conductor 237 to the other side of the supply circuit. No matter which key is operated, the circuit through the coils 204 is traced in the same way. Although the circuit of coils 204 is broken before the arm 96 actually strikes the set-up stop 130, the pin 229 projects so slightly above the stop that the momentum of the moving parts carries the arm 96 against the stop into correct tuning position.

The circuit of motor 213 in Fig. 15 is controlled by the switches 50. It has already been explained that the switches 50 are normally open and are closed individually by the key-operated levers 39. To trace the motor circuit let us suppose that key D has been actuated. From the supply main 221 we go through wire 238 to the motor windings, from there through wire 239 to point 240 of the common contact bar 48, through the closed switch 50d, then through the common contact bar 52 to point 241, and through wire 242 to the return lead 237. It is seen from this that the motor 213 and the clutch coils 204 are connected in parallel, that each of these parallel branches goes through the switches 50, and that the circuit of coils 204 goes through the switches 225 in series. Consequently, when any one of these series switches is opened by the corresponding arm 96 striking the actuated stop 130, as previously explained, the clutch circuit is broken and the tuning shaft 93 is stopped, even if the motor 213 should still be running. In other words, after a key has been pushed down to close the switches 50 and 217, it makes no difference how long the operator holds the key depressed, because the clutch circuit is automatically opened when one of the arms 96 encounters the actuated stop 130. It takes only a fraction of a second for the motor to turn the condenser shaft into tuning position, so that a person need not hold down an actuated key any longer than is necessary for him to feel that the key has been fully pushed down. If desired, the motor circuit can be led through the series switches 225, so that the opening of any one of these switches simultaneously deenergizes the clutch coils 204 and stops the motor.

Attention is called to the fact that the system of Fig. 15 requires no restoring mechanism for the condenser shaft 93. It is immaterial in what position this shaft is left when the switch 18 is thrown off. When a control key is depressed, the shaft 93 is rotated until stopped by the actuated stop 130, irrespective of what position the shaft previously occupied. In this respect, the system of Fig. 15 is simpler than that of Fig. 14. Furthermore, the motor drive of Fig. 15 is preferable to the solenoid drive of Fig. 14. The main switch 18 in Fig. 15 includes only two sets of contacts, as compared with the four sets of contacts in Fig. 14. The switch 171 connects the radio set to the supply circuit, the same as in Fig. 14. The other switch operated by lever 18 comprises a spring finger 244 and a contact member 245. The restoring coil 84, which shifts the bar 71 to releasing position, is connected to spring finger 244 by a conductor 246. The contact member 245 is connected to a conductor 247, which forms a common connection for one side of the restoring coils 136. These coils are therefore connected in parallel to conductors 243 and 247, and the circuit is closed through all these coils whenever the switch members 244 and 245 are brought into contact by the toggle lever 18. Otherwise, what has been said about the operation of Fig. 14 applies to Fig. 15 without the need of repetition. For this reason I have used the same reference characters to indicate like parts in these two systems.

In Fig. 15, the circuit of motor 213 and the circuit of the magnetic clutch coils 204 are connected in parallel. These connections may be so changed that the motor 213 and coils 204 are connected in series, and the switches 225 connected in parallel with each other. This modification, which is diagrammatically indicated in Fig. 16, is simpler than the system of Fig. 15 to the extent that the switches 217 can be omitted. It is clear from Fig. 16 that, when any one of the key-controlled switches 50 is closed, the circuit is completed through the motor 213 and the magnetic clutch coils 204, until the arm 96 on the condenser shaft strikes the actuated stop 130 and opens the corresponding switch 225.

In a preferred embodiment of the automatic tuning system illustrated in Fig. 15, I provide means to inform the operator when the condenser shaft has reached tuning position. For this purpose I make use of the lamps 89, which are behind the windows 19, and so connect them in circuit that the lamp associated with an actuated key is not lighted until the condenser shaft is in correct tuning position. In Fig. 15, the lamps 89 are connected in parallel in a circuit represented by conductors 248 and 249 which lead to a battery 250, or other source of power. In practice, the lamp circuit will be connected to the plug 173, but I have indicated a separate source of current 250, in order to simplify the circuit diagram. In Fig. 15, as in Fig. 14, the lamps 89 are individually distinguished by suffix letters to indicate the corresponding keys with which the lamps are associated. Referring to Figs. 17 and 18, it will be seen that the insulating block 226 of each stop 130 carries a pair of switch contacts 251 and 252, which may be spring fingers normally held apart by inherent tension to keep the lamp circuit open. The spring finger 251 carries at its free end an insulating projection 253 arranged to be engaged by the switch arm 228 when the latter is pushed down by the arm 96. This actuation of member 251 moves it into contact with member 252 to close the branch circuit of the associated lamp. As seen in Fig. 15, the lamps are controlled individually through the parallel branch circuits 254, and each of these circuits is controlled by the switch member 251 on the corresponding stop 130. Normally, the lamps are unlighted, because their respective branch circuits are all open. Let us now say that key A is pushed down. As soon as the arm 96a on condenser shaft 93 strikes the projection 229 on the set-up stop 130a, the associated switch arm 251 is closed and lamp 89a is lighted. The operator is now informed that the condenser shaft has reached tuning position, so that it is safe to release the depressed key.

Fig. 19 illustrates diagrammatically another embodiment of my invention, in which the condenser shaft 93 is driven by the electric motor 213 through a slip clutch. Perhaps the simplest form of a clutch of that kind comprises a spring belt 255 running over a small pulley 256 on the motor shaft and a larger pulley 257 on the condenser shaft. The belt 255, which is here assumed to consist of a wire coil spring, is sufficiently tensioned to drive the condenser shaft when the motor circuit is closed until one of the arms 96 strikes the set-up stop 130. The condenser shaft is now stopped, even if the motor shaft should continue to rotate, because the spring belt 255 will slip in one or both of the pulleys 256 and 257. The motor circuit is controlled by the key-operated switches 50, which are normally open. When any one of these switches is closed, the motor circuit is completed through the following connections. From supply main 221 to wire 238, through the motor windings and wire 239 to point 239', then through the common contact bar 48, from there through the closed switch 50 to the common conductor 52, and from there by wire 258 to the return lead 237. If desired, the switches 225 of Fig. 15 may also be used in the system of Fig. 19, but I have omitted them to avoid needless repetition. Otherwise, what has been said about the operation of Figs. 14 and 15 applies to Fig. 19. The motor circuit of Fig. 15 and Fig. 19 may include a rheostat 259 to regulate the current as required.

In the remote-control tuning systems of Figs. 14, 15, and 19, the various electromagnetic devices are automatically cut out of circuit after performing their intended functions, so that no current is consumed during the operation of the receiver. Thus, when a depressed key is released, it is raised by spring 44 sufficiently to open the switches 50, 58, and 70 (see Fig. 6), whereby the circuits through coils 113, 138, and 83, respectively, are broken. In Fig. 15, the magnetic clutch coils 104 are automatically cut out of circuit by the opening of switch 225 when the condenser shaft is in tuning position, and the circuit of the driving motor 213 is interrupted when the operator releases the depressed key of the control box. As for the restoring coils 84 and 139 in Figs. 14, 15, and 19, and the restoring coils 114 and 148 in Fig. 14, these circuits are closed only when the switch lever 18 passes from "on" to "off" position or vice versa. Consequently, the automatic tuning apparatus of my invention requires very little consumption of current, being in circuit only for a few seconds when a key is depressed and when the main switch 18 is thrown off. This advantage of economy is of practical importance. Of course, one of the indicating lamps 89 is alight during the operation of the receiver, but these small lamps consume a negligible amount of current, and moreover they can be omitted.

In some of the constructions that have been described, or that may be devised by others within the scope of this invention, it is possible that the arms 96 may strike the set-up stops 130 with such force as to rebound and thereby throw the condenser shaft out of correct tuning position. To prevent the possibility of this happening, I provide positive locking means between the stops 130 and the tuning arms 96, whereby the latter are automatically locked to the set-up stops to assure the correct position of the condenser shaft. This automatic locking means may be carried out in various ways, one of which is illustrated as an example in Figs. 20–22. Each arm 96 carries at its free end a head 260 on which is mounted a U-shaped spring latch consisting of a pair of fingers 261 shaped to form locking shoulders 262. The free ends of the latch fingers 261 terminate in diverging extensions 263. The spring latch 261 is connected to the head 260 in any practical way, as by a screw or rivet 264. When the arm 96 approaches the set-up stop bar 130, the latter spreads the spring fingers 261 by passing between the beveled extensions 263. As soon as the arm 96 strikes the stop bar 130, the shoulders 262 of spring latch 261 snap under the bar and positively lock the arm against reverse movement. In other words, when the condenser shaft reaches its intended tuning position, it becomes automatically locked in that position until the stop bar 130 is withdrawn during the restoring operation. To facilitate the cam action between the stop bar 130 and the diverging extensions 263, the sides of the bar may be beveled, as indicated at 265 in Fig. 22. This automatic locking feature may be considered as applied to the tuning arms 96 in all the embodiments herein described, but for simplicity and clearness in the drawings, this particular feature has not been illustrated in the assembly views.

Instead of providing the control box K with windows 19, to be illuminated when the corresponding keys are pushed down, I may provide the keys themselves with lamps and transparent or translucent windows. A key of this novel construction is illustrated in Fig. 23, except that the lower portion of the key has been omitted for lack of space. This key comprises a tubular stem 266, which may be a small thin tube of brass or aluminum terminating in a screw-threaded upper end 266' on which an insulating cup 267 is screwed. A lamp socket 268 is mounted on the bottom of cup 267, and the terminals of this socket are connected to conductors 269, which pass through the hollow stem 266. The socket 268 is adapted to receive a small electric light bulb 270. The upper end of cup 267 is closed by a cap 271 of transparent or translucent material, such as celluloid, oiled paper, glass, isinglass, etc. The cap 271 is supposed to have written or printed thereon appropriate marks for identifying a selected station. The cylindrical flange 272 of cap 271 is sufficiently springy to grip the cup 267 in a tight fit and yet permit removal of the cap when desired. It is self evident that the cap 271 should be sufficiently strong to withstand the pressure of the finger when the key is pushed down. The lamp 270 may be lighted continuously after the main switch 18 has been thrown on, but it is preferable to utilize the lamp circuit control described in connection with Figs. 14 and 15, where a lamp is lighted only when a key has been pushed down. The illuminated key is a constant reminder to the operator that the radio set is tuned to a certain station. When the control box K is provided with a set of self-lighting keys, such as I have just described, the light transmitting caps 271 may be of different colors to emphasize the optical effects of the lighted keys.

Although I have shown and described certain specific constructions, I want it understood that the various features of my invention may be embodied in other ways than herein set forth by way of example. It is to be expected that, when engineers undertake to build automatic radio receivers in accordance with this invention, they will resort to changes and modifications to suit their particular requirements or preferences, without departing from the scope of my invention as defined in the appended claims. When I speak of a tuning shaft in the claims, I do not necessarily mean a shaft on which the tuning elements are mounted, but I include any shaft that controls the position or condition of the tuning means with which the receiver is provided.

I claim as my invention:

1. The combination of a radio receiver having a tuning shaft, electromagnetic mechanism for operating said shaft, mechanical means for positively stopping said shaft in a predetermined position, electromagnetic means adapted when energized to render said shaft-stopping means operative, means for de-energizing said electromagnetic means after the shaft is stopped in desired tuning position, means for automatically de-energizing said electromagnetic operating mechanism in response to the stopping of the shaft, means for locking the stopped shaft against rebound, means whereby the operative condition of said locking means is not affected by the de-energizing of said electromagnetic means, and manually controlled means for releasing the locking means.

2. The combination of tuning means for a radio receiver, electromagnetic mechanism for operating said tuning means predetermined amounts to bring in any one of certain broadcasting stations, an electric control device having a set of manually operable members representing said stations, connections controlled by said members to cause said mechanism to automatically operate said tuning means to bring in the station represented by the actuated member, a normally open switch associated with each member and arranged to be closed by the movement of said member to tuning position, a signal lamp mounted adjacent each member and controlled by the associated switch, whereby the operation of any member automatically lights the adjacent lamp, and means for preventing operation of another key as long as the lamp of a previously actuated key remains lighted.

3. In combination with a radio receiver having a tuning shaft operated by an electric motor, a series of selectively controllable devices representing each a station, means whereby each device is adapted to stop the shaft and open the motor circuit in response to the stopping of the shaft when the selected station is tuned in, a series of keys for selectively operating said devices, connections for closing the motor circuit when any key is operated, means for locking an actuated key against return to normal position, said locking means also locking the other keys against operation, and a manually operable member separate from said keys for moving said locking means to releasing position.

4. The combination of a radio receiver having a tuning shaft, means for operating said shaft, a series of electromagnetic devices arranged longitudinally of said shaft, each device representing a certain station, a movable member operated by each device when the latter is energized, a plurality of arms mounted on said shaft in different angular positions and axially spaced, so that each arm is in line with one of said members and engages the same when the latter is in actuated position, whereby the shaft is positively held in selected tuning position, a series of keys for selectively energizing said devices, an electric lamp associated with each key, a normally open switch in the circuit of each lamp, and means for mechanically closing the switch of the corresponding lamp circuit when an actuated member is engaged by the aligned arm, whereby the lamp of an actuated key is automatically lighted when the selected station is tuned in.

5. The combination of a radio receiver having a tuning shaft, a projection on said shaft, an adjustable stop movable into and out of the path of said projection, means for operating said shaft, and means for automatically locking said projection to said stop when these parts engage each other, said locking means permitting withdrawal of said stop from the path of said projection.

6. In a radio receiving system, the combination of a tuning shaft, an electric motor for operating said shaft, an adjustable stop for controlling the movement of said shaft, means on said shaft to engage said stop when the latter is in operative position, said stop and means co-operating to arrest the movement of said shaft in a direct mechanical way, and means for automatically breaking the motor circuit in response to the stopping of the shaft by said stop, said last mentioned means including a switch element movably mounted on said stop and actuated by said means on the shaft.

7. The combination of tuning means for a radio receiver, electromagnetic mechanism for operating said tuning means predetermined amounts to bring in any one of certain broadcasting stations, an electric control device having a set of manually operable keys representing said stations, connections controlled by said keys to cause said mechanism to automatically operate said tuning means to bring in the station represented by the actuated key, means for automatically locking an actuated key against return movement and at the same time locking the other keys against operation, and electrically controlled means for releasing said locking means.

8. The combination of a radio tuning shaft, an electric motor for operating said shaft, an electromagnetic clutch for operatively connecting the motor with said shaft, a plurality of adjustable stops representing each a certain broadcasting station, a corresponding plurality of means on said shaft adapted each to engage one of said stops to limit the movement of the shaft, said stops being normally out of the path of travel of said engaging means and being substantially immovable when struck by said means, whereby the tuning shaft is stopped in a direct mechanical way, key-controlled electromagnetic mechanism for selectively operating said stops, and switch means carried by each stop and movable independently thereof to break the circuit of said clutch in response to the shaft striking the selected stop, said tuning shaft being always free to be manually operated.

9. The combination with a radio cabinet containing a rotary tuning shaft, electromagnetic apparatus for operating said shaft and a plurality of electromagnetic devices selectively controlled to limit the rotation of said shaft through a predetermined angle, of an electric control box separate from said cabinet and usable at a distance therefrom, a set of keys carried by said box, each key representing a selected station, switch mechanism in said box controlled by each key to operate one of said electromagnetic devices and thereby limit the rotation of said shaft to tune in the station represented by the actuated key, means whereby the operation of any key energizes said electromagnetic apparatus to actuate the tuning shaft, a signal lamp in said box for each key, these lamps being normally unlighted, circuit connections automatically controlled by the movement of any key to station-selecting position for lighting the signal lamp of the actuated key, and means for preventing operation of another key as long as the lamp of a previously actuated key remains lighted.

10. The combination of a radio receiver having a rotary tuning shaft provided with radial arms axially spaced on the shaft and arranged in predetermined angular relation, each arm representing a selected station, a series of movable stops associated with said arms and normally out of the path of movement of said arms, electromagnetic means associated with each stop to move the same into and out of the path of the particular arm controlled by that stop, said stops being substantially immovable when struck by said arms, so that each stop positively limits the rotation of said shaft through a predetermined angle, electromagnetic mechanism for operating said shaft, means automatically operable in response to the engagement of any one of said arms with the associated stop for locking the stopped shaft against rebound, electric connections for energizing the electromagnetic means of each stop to move the same into the path of the corresponding arm on said shaft, a series of manually operated members for selectively actuating any stop to bring in the desired station, and means for automatically stopping the operation of said mechanism when a desired station is in tune.

11. A remote tuning device for radio receivers in which the tuning shaft is operated by electromagnetic mechanism, said device comprising a portable box provided with a series of depressible keys, each key representing a selected station, normally open switch means in said box closed by each key when the latter is depressed to control said mechanism, means for locking a depressed key against return to normal position, a switch carried by said box for turning the receiver on and off, and means controlled by said switch for releasing the locked key.

12. A remote control device for radio receivers comprising a series of keys representing each a station, switch means associated with each key for closing the circuit of an electric motor which drives the tuning shaft of the receiver, means for automatically locking an actuated key against return to normal position, said locking means also preventing operation of the other keys, and electromagnetic means for rendering said locking means ineffective.

13. A radio receiver having variable tuning elements normally unbiased to any position, means for operating said elements, other means for locking said elements in selected tuning position, said locking means including a movable part adapted to remain in locking position without attention by the operator, and electromagnetic means for moving said part to releasing position.

14. A radio receiver having an adjustable tuning member normally unbiased to any position, means for operating said member, other means for stopping said member in selected tuning position, said stopping means automatically locking said member when it stops, said locking means including a movable part adapted to remain in locking position without attention by the operator, and electromagnetic means for moving said part to releasing position.

15. The combination of a radio tuning shaft having an arm, a stop movable into and out of the path of said arm, and means for automatically locking said arm to said stop when these parts engage, whereby the shaft is locked in tuning position.

16. The combination of a radio tuning shaft, a slidable bar mounted to move at right angles to said shaft, means on said shaft adapted to engage said bar when the latter is in operative position for stopping the movement of said shaft, a pivoted member connected to said bar for actuating the latter in both directions, electromagnetic means for rocking said member in one direction, and other electromagnetic means for rocking said member in the other direction.

17. In a radio receiver, the combination of a rotary shaft for operating a variable tuning device, a member carried by said shaft and rotatable therewith, a stop movable into and out of the path of said member, and means for automatically locking said member to said stop when these parts engage.

18. In a radio receiver, the combination of a rotary shaft for operating a variable tuning device, a plurality of stops movable into and out of operative position, means for selectively controlling said stops individually, and means carried by said shaft and adapted to become locked to any stop in operative position.

19. A radio receiver having a rotary tuning shaft and mechanism for operating said shaft to desired tuning position, in combination with a set of keys for controlling said mechanism to stop said shaft in tuning position for a preselected station, means whereby any actuated key is locked against return to normal position, a switch for turning the electric power for said receiver on and off, and means automatically controlled by the opening of said switch for releasing a locked key.

20. A radio receiver having a tuning shaft and electromagnetic mechanism for operating the same to preselected positions, said receiver having a manually operable switch for turning the electric power on and off, in combination with a set of push buttons representing certain stations, electric connections between said push buttons and said mechanism for controlling the latter to tune in the station represented by an actuated push button, means for automatically locking any actuated push button against return to normal position, said locking means also locking the other push buttons against actuation, electromagnetic means for operating said locking means to releasing position, and connections for energizing said releasing means when said main power switch is closed.

21. In a radio receiver, the combination of a rotary shaft operable for tuning said receiver, means for actuating said shaft, a plurality of independently movable stops representing each a certain station, an electromagnetic device associated with each stop for actuating the same to stopping position, means whereby any stop remains in stopping position when the associated device is de-energized, selectively operable means for energizing any one of said devices, means movable with said shaft for engaging an actuated stop and thereby arresting further rotation of the shaft, and electromagnetic means adapted when energized to restore any actuated stop to normal inoperative position, said restoring means being independent of said devices.

22. In a radio receiver, the combination of a switch for turning the electric power for the receiver on and off, a rotary tuning shaft adapted to occupy a normal predetermined position, an electric device for actuating said shaft in one direction from normal position to tune in a desired station, manually controlled means for stopping said shaft in preselected position, a second electric device for actuating said shaft in the reverse direction back to normal position, and means for energizing said second device when said main power switch is closed.

23. A radio receiver provided with an adjustable tuning member, means for locking said member in preselected tuning position, a switch for turning the electric power for said receiver on and off, and means controlled by said switch for releasing the locked tuning member.

24. In tuning apparatus for a radio receiver, the combination of a rotary tuning shaft, means for operating said shaft, a set of individually movable stops normally inoperative in relation to said shaft, each stop representing a certain station, a plurality of selectively operable means for moving any desired stop into operative position to arrest said shaft in preselected tuning position, switch mechanism for turning the electric power for said receiver on and off, a finger piece for operating said switch, and means automatically controlled by the operation of said finger piece for moving a previously actuated stop back to normal inoperative position.

25. A radio receiver provided with a switch for turning the electric power on and off, said switch comprising a movable finger piece, a rotary tuning shaft, electric mechanism for operating said shaft to preselected tuning positions, said mechanism including a series of individually controllable members for stopping the shaft in predetermined position, a pair of electromagnetic coils associated with each member for moving the same into and out of operative position respectively, each pair of said coils comprising a stopping coil and a releasing coil, a set of push buttons for individually controlling the circuits of the stopping coils, and switch connections controlled by said finger piece for energizing the releasing coils when said power switch is closed.

26. The combination of a radio receiver having a tuning shaft, electromagnetic mechanism for operating said shaft to bring in any one of a series of broadcasting stations, an electric control box having a series of push buttons representing said stations, connections controlled by said push buttons for energizing said mechanism to rotate said shaft until the station represented by the actuated push button is in tune, a series of signal lamps in said box, there being a lamp for each push button, a series of normally open switches mounted in said box and arranged to be actuated by said push buttons, whereby the operation of any push button automatically lights the associated lamp, which stays lighted as long as the corresponding station remains in tune, and means for preventing the operation of another push button as long as the lamp of a previously actuated button remains lighted.

27. A radio receiver having a rotary tuning shaft, an electric motor normally disconnected from said shaft, an electromagnetic clutch for coupling the motor to said shaft, a set of normally closed switches connected in parallel, means controlled by said shaft for automatically opening any one of said switches when the shaft reaches a predetermined position, a second set of normally open switches connected in parallel, the corresponding switches of the two sets being connected in series, a set of push buttons for individually closing said normally open switches, each push button representing a certain station, and an electric circuit for said motor and clutch, said circuit including both sets of switches, whereby said motor and clutch are energized only when a push button is operated and are de-energized when the normally closed switch in series with the closed push button switch is opened by the tuning shaft.

28. The combination of radio tuning mechanism having movable elements operated by a common shaft which is normally unbiased to any angular position, with mechanism for controlling the movement of said shaft comprising a second shaft, an electric motor for operating said second shaft, connections between said shafts for rotating the first shaft in alternately opposite directions through a predetermined arc, said connections including means for automatically preventing rotation of the first shaft beyond either end of its definite arc of travel, means arranged for movement with one of said shafts, normally inoperative means adapted for engaging with said last-mentioned means to stop the angular movement of said last-mentioned shaft at a predetermined position, manually controlled means for effecting the angular movement of said last-mentioned shaft and for rendering said normally inoperative means operative, means for manually operating said first shaft independently of the electric motor, and means whereby said two shafts are normally disconnected to permit manual operation of the first shaft at any time, said last-mentioned means causing automatic connection of the two shafts when said normally inoperative means are rendered operative.

29. The combination of radio tuning mechanism having movable elements operated by a common shaft which is normally unbiased to any angular position, with mechanism for controlling the movement of said shaft comprising a second shaft, an electric motor for operating said second shaft, connections between said shafts for rotating the first shaft in alternately opposite directions through a predetermined arc, said connections including means for automatically preventing rotation of the first shaft beyond either end of its definite arc of travel, means arranged for movement with one of said shafts, an element operable for engaging with said last-mentioned means to stop said last-mentioned shaft at a predetermined point, another element operable for engagement with said last-mentioned means to stop said last-mentioned shaft at a different point, means for selectively operating said elements, means for manually operating said first shaft independently of the electric motor, and means whereby said two shafts are normally disconnected to permit manual operation of the first shaft at any time, said last-mentioned means causing automatic connection of the two shafts when the electric motor is energized.

30. The combination of a radio tuning shaft carrying a member rotatable therewith, a second member mounted independently of said shaft and movable into and out of the path of said first member, means whereby said members interlock when they engage, so that said shaft is locked in selected tuning position, said second member remaining in locking position without attention by the operator, and means for moving said second member to releasing position.

31. A radio receiver having a rotary tuning shaft, an electric motor for operating said shaft, and manually controlled electric means for automatically stopping said shaft in preselected tuning position, said means including a pair of movable members which are locked to each other when the rotating shaft reaches its tuning position, one of said members being fixed upon the shaft and the other member being mounted independently of the shaft.

32. A radio receiver having a rotary tuning shaft, an electric motor for operating said shaft, manually controlled electric means for automatically stopping said shaft in preselected tuning position, said means including a pair of movable members which are locked to each other when the rotating shaft reaches its tuning position, one of said members being fixed upon the shaft and the other member being mounted independently of the shaft, and electromagnetic means for disengaging said members to release the shaft for operation by said motor.

33. A radio receiver having a rotary tuning shaft, an electric motor for operating said shaft, an arm fixed on said shaft to represent a preselected station, a normally closed switch arranged to be engaged and opened by said arm when the shaft is in tuning position for said station, means whereby the opening of said switch de-energizes said motor, a movable element adapted to engage said arm and thereby positively stop said shaft in selected tuning position, and electromagnetic means for moving said element out of engagement with said arm.

34. In a radio receiving system, the combination of a rotary tuning shaft and mechanism for operating the same, electric control apparatus having a set of depressible keys representing certain broadcasting stations, said apparatus also having a power switch manually operable to turn the electric current for the receiver on and off, connections whereby the operation of any key causes said mechanism to actuate said shaft to tune in the station represented by said key, means controlled by the movement of an actuated key for automatically locking said key against return movement, means for releasing any actuated key for return to normal position, said releasing means including an electromagnetic device for operating said locking means to releasing position, and electric connections for automatically energizing said key-restoring device during the movement of said power switch to open position, said device being de-energized when the switch is in final open position.

35. In a device of the character described, the combination of a radio condenser tuning shaft, a plurality of manually operable stop devices, each corresponding to a certain position of tuning adjustment of the shaft, a motor adapted to automatically rotate the shaft upon operation of any one of said devices, means responsive to the rotation of the shaft and cooperating with said stop devices for arresting the shaft at a predetermined position of adjustment corresponding to the device actuated, and means for resetting said stop devices to inoperative position, said reset means being arranged to also automatically actuate the motor for returning said shaft and said responsive means to an initial starting position.

36. A radio receiver having a tuning shaft, electromagnetic mechanism for operating said shaft, a plurality of electromagnetic devices for limiting the rotary movement of said shaft to predetermined amounts, each device representing a station to be tuned in, in combination with a remote control box having a plurality of selectively operable keys which represent the same stations as said devices, a pair of normally open switches associated with each key and both adapted to be mechanically closed by the actuated key, said pairs of switches being mounted in said box, circuit connections between one switch of each pair and a corresponding one of said devices, circuit connections between the other switches and said electromagnetic mechanism, and means in said box whereby any actuated key closes the first switch of the associated pair in advance of the other switch for energizing the corresponding electromagnetic device in the receiver in advance of said shaft-operating mechanism.

37. Radio tuning apparatus comprising a rotary tuning shaft, an electric motor for operating said shaft in opposite directions through a definite arc, means for automatically preventing the motor from rotating the shaft beyond either end of its range of travel, a plurality of elements carried by said shaft and representing each a certain station, a corresponding plurality of individually adjustable members representing the same stations as said elements, each member being engaged by one of said elements when the shaft is in tuning position for the station represented by the engaged member, whereby the shaft is stopped in preselected tuning position, means for automatically de-energizing the electric motor in response to the engagement of any element with the associated member, in combination with a remote control box having a set of keys representing the same stations as said elements and members, a signal lamp associated with each key, these lamps being mounted in the box and normally unlighted, means whereby the operation of any key automatically moves the corresponding member into position to be engaged by the associated element to stop the shaft in tuning position for the station represented by the actuated key, and means for automatically lighting the lamp of the actuated key in response to the stopping of the shaft.

ADOLPH A. THOMAS.